United States Patent
Bajpay et al.

(10) Patent No.: US 8,665,861 B1
(45) Date of Patent: Mar. 4, 2014

(54) VOIP DELAY FOR PREDICTIVE MAINTENANCE

(75) Inventors: Paritosh Bajpay, Edison, NJ (US); Hossein Eslambolchi, Los Altos Hills, CA (US); John McCanuel, Bailey, CO (US); Moshiur Rahman, Marlboro, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1787 days.

(21) Appl. No.: 11/288,445

(22) Filed: Nov. 29, 2005

(51) Int. Cl.
| | |
|---|---|
| *H04L 12/66* | (2006.01) |
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl.
USPC .......................................... 370/352; 370/229

(58) Field of Classification Search
USPC .......................... 370/352, 248, 229; 709/224
See application file for complete search history.

(56) References Cited

U.S. PATENT DOCUMENTS

| | | | |
|---|---|---|---|
| 5,872,911 | A | 2/1999 | Berg |
| 6,041,332 | A | 3/2000 | Miller et al. |
| 6,097,702 | A | 8/2000 | Miller et al. |
| 6,446,123 | B1 | 9/2002 | Ballantine et al. |
| 6,542,462 | B1 * | 4/2003 | Sohraby et al. ............... 370/229 |
| 6,559,769 | B2 | 5/2003 | Anthony et al. |
| 6,691,064 | B2 | 2/2004 | Vroman |
| 2002/0198985 | A1 * | 12/2002 | Fraenkel et al. .............. 709/224 |
| 2003/0120813 | A1 * | 6/2003 | Majumdar et al. ............ 709/206 |
| 2005/0002400 | A1 * | 1/2005 | Karol et al. .................... 370/394 |
| 2006/0274664 | A1 * | 12/2006 | Pandya ........................ 370/249 |

* cited by examiner

*Primary Examiner* — Ahmad Matar
*Assistant Examiner* — Nafiz E Hoque (57) ABSTRACT

A method automatically detects and isolates total, partial, and latent total failures of one or more network segments by analyzing delay data collected by an internet protocol monitor during the set-up or termination of an internet protocol connection. The overall and/or intermediate delays of protocol messages exchanged during the set-up or termination of an internet protocol call connection are monitored and flagged based on threshold values. By analyzing the overall and/or intermediate delays, one or more potential problem segments can be isolated.

10 Claims, 6 Drawing Sheets

VOIP DELAY FOR PREDICTIVE MAINTENANCE

FIELD OF INVENTION

The present invention relates generally to predictive maintenance for voice over interne protocol (VoIP) system. In particular, the present invention analyzes data from a VoIP protocol monitor to detect and isolate problems with one or more network segments.

BACKGROUND

Customers communicating over a voice over interne protocol (VoIP) network are severely impacted when an entire network or even a portion of a network is rendered inoperable by unexpected failure of network hardware or software. When a portion of a network is down, the quality of service for a customer is degraded, and if a critical component of a network is down, the basic services offered by VoIP carriers such as phone calling can be suspended.

The problems associated with network failure due to software or hardware malfunctions are further exacerbated by extended periods of downtime due to failure identification. If the malfunctioning components of a network are not readily identifiable, the time taken to repair a problem can be extended by troubleshooting and testing components simply to find the failure. This not only increases the costs to the customer, but also increases the costs of the network provider.

Systems such as operations support systems that have been developed to manage the operations of networks are capable of detecting network failures, but operations support systems are not capable of detecting potential/latent or partial failures before they become a total failure. For example, a software error on a particular network node may significantly slow down a connection, but may not be detected as a problem by typical operations support systems until the software problem develops into a total failure. Likewise, a latent hardware issue such as a faulty wire connection may be impeding system performance and may exist undetected by operations support systems until the connection totally fails.

Operations support systems are also not capable of isolating the location or reasons for a specific network elements or connections that are causing a failure. For example, a particular network node may fail, but because that node has been rendered inoperable, the failed node will not be able to identify itself as a problem. Without a method for readily identifying the failing node or nodes, the problem may only be isolated through time-consuming troubleshooting. If multiple nodes simultaneously failed, a particular problem with one node may not be even be detected until problems with other nodes have been isolated and corrected because visibility to a problem may be masked by other unrelated problems. Thus, there is a need for a method to automatically detect and isolate total, partial, or latent total failures of network elements or connections.

SUMMARY OF THE INVENTION

A method automatically detects and isolates total, partial, and latent total failures of one or more network segments by analyzing delay data collected by an internet protocol monitor during the set-up or termination of an internet protocol connection. The overall and/or intermediate delays of protocol messages exchanged during the set-up or termination of an internet protocol call connection are monitored and flagged based on threshold values. By analyzing the overall and/or intermediate delays, one or more potential problem segments can be isolated.

DETAILED DESCRIPTION

Figure 1:
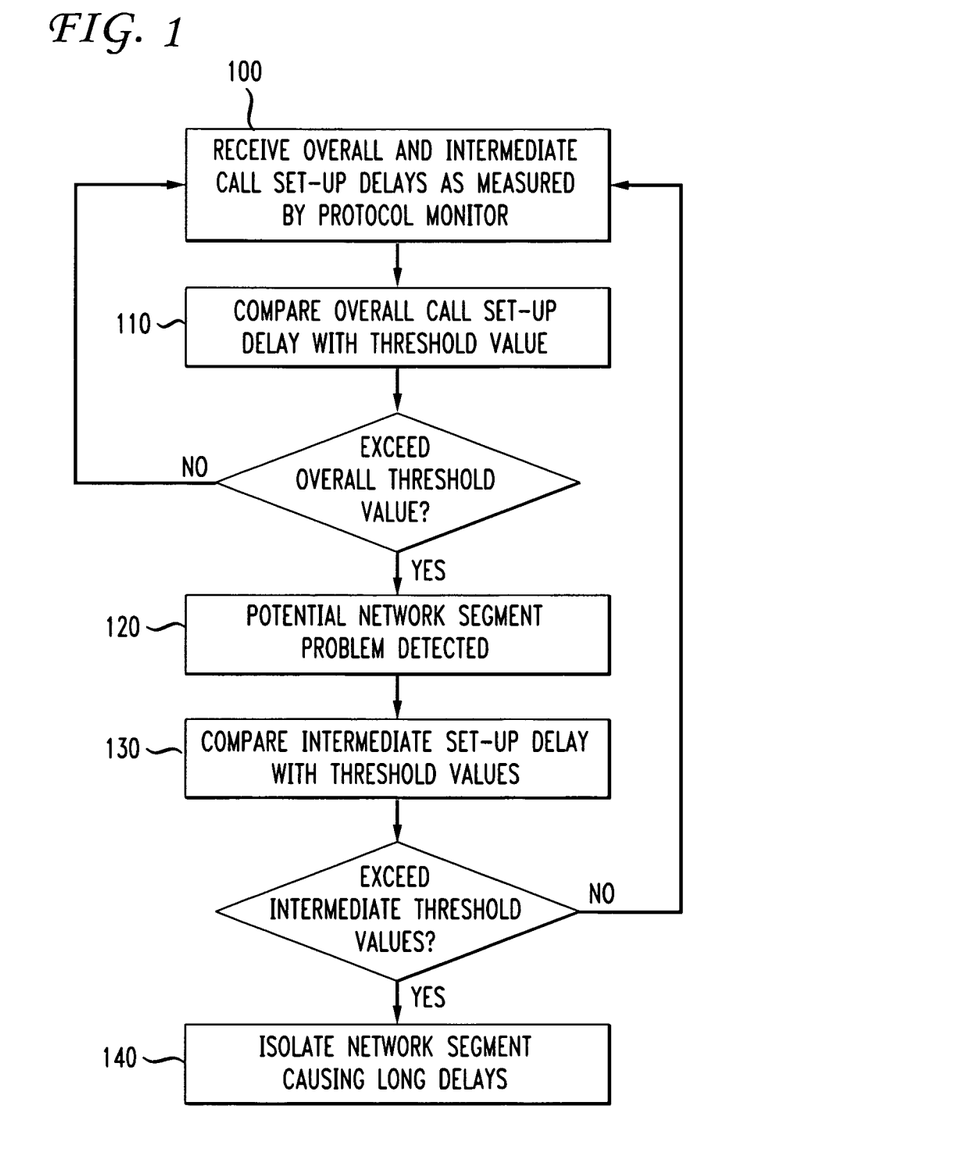
FIG. 1 is a flowchart that illustrates the analysis of call set-up protocol message delays.
Figure 2:
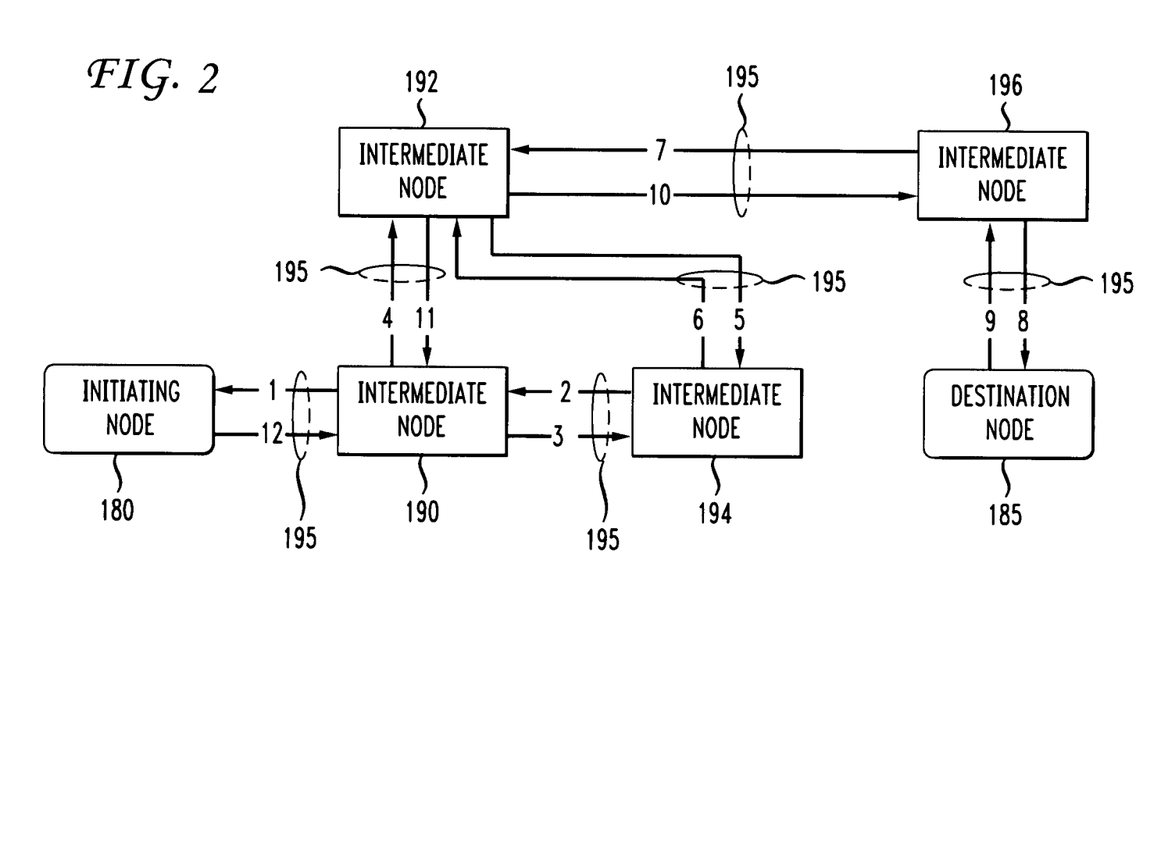
FIG. 2 is a diagram illustrating call set-up protocol message exchanges.

FIG. 1 is a flowchart that illustrates the process of monitoring call set-up initiation protocol delays to detect and isolate a problem or a potential problem with one or more network segments. A network segment includes any part of a network such as a connection, a network element or any combination of connections and network elements. The flowchart shows that overall and intermediate delays of call set-up messages sent between network nodes as measured by a protocol monitor are received 100. The protocol monitor measures the overall call set-up delay as the time between an initial call protocol message sent by a call initiating node and a connection message later received by the call initiating node indicating that a connection has been established with a call destination node. In a typical scenario, communication between intermediate nodes is required to establish a connection between the call initiating node and the call destination node. The delays between request and response messages between intermediate nodes necessary to establish the connection between the call initiating node and the call destination node are intermediate call set-up delays. The sum of the intermediate delays make up the overall call set-up delay. FIG. 2, described below, illustrates the relationship between the overall set-up delay and the intermediate delays.

FIG. 2 shows the exchange of call set-up messages between a call initiating node 180, a call destination node 185, and intermediate nodes 190-196. The messages are exchanged in sequential order according to the numbers 1-12. The overall delay is the difference in time between an initial call protocol message 1 sent by the call initiating 180 node and a connection message 12 received by the call initiating node 180 indicating that a connection has been established with the call destination node 185. The delays of messages sent and received between the intermediate nodes 190, 192, 194, and 196 are the intermediate delays 195. Each of the intermediate delays 195 is associated with an intermediate node or a connection between nodes. For example, the intermediate delay 195 that is the difference between the exchange of messages 5 and 6 can be isolated to the processing in intermediate node 194 or the connection between intermediate nodes 192 and 194.

Referring back to FIG. 1, the figure shows that the overall call set-up delay time is then compared with an overall threshold value 110. The overall threshold value can be, for example, a 1 sigma threshold limit statistically derived from empirical data of the normal overall call set-up delay for a particular configuration of call set-up nodes or equipment. If the call set-up delay time is less than the overall threshold value, indicating that the set-up delays are normal, the overall call set-up delay values as measured by the protocol monitor continue to be received 100. If the call set-up delay time is greater than the overall threshold value, a potential network segment total, partial, or latent failure has been detected 120 as evidenced by the long overall call set-up delay and the deviation automatically triggers an analysis of the intermediate delays.

The intermediate delay analysis can be triggered by an alarm indicator indicating that the overall call set-up delay has been exceeded. The alarm indicator can trigger the intermediate delay analysis and/or can specify what kind of intermediate delay analysis is to be performed. For example, the alarm indicator may indicate that the intermediate delay analysis should start with particular intermediate delays and then be expanded to other intermediate delays if necessary. Also, different levels of threshold values can be set to trigger different levels of response and different types of analysis. The different levels of response and analysis can be triggered through the alarm indicator.

To isolate which segment of the call set-up network is causing the excessive overall call set-up delay variation, the intermediate set-up delays are compared with intermediate threshold values 130. Like the overall delay threshold value, the intermediate threshold values can also be statistically derived. If one or more of the intermediate call set-up delay times are greater than their respective intermediate threshold values, the segment of the call set-up process causing the long delays are isolated 140 by analyzing the intermediate call set-up delay times associated with network nodes. The segment of the call set-up process causing the long delays can be a single element such as a network node or a connection between network nodes or combinations of network nodes or connections. Also, the segment or segments causing the long delays can be in failure states that include partial, total, or potential failures. An example of the isolation of network nodes is described in detail in the embodiment described in FIGS. 3-6.

In the flowchart both intermediate and overall delays were monitored, measured, and collected and the intermediate delays were only analyzed when the overall delays exceeded a threshold value. In an alternative embodiment, the intermediate and overall delays can be analyzed in a variety of combinations. For example, only the intermediate delays can be monitored and compared with threshold values regardless of the overall delays. In another embodiment, the overall delay or a single intermediate delay can be the only delay monitored. In yet other embodiments, a combination of the intermediate delays and overall delays can be used to flag potential problems in the nodes involved in call set-up. The delays for certain nodes can be monitored more closely and different threshold values can be determined and set for the overall or intermediate delays as well as for combinations of overall and intermediate delays. The method described in the flowchart can be used to isolate specific problems with segments of a network in both commercial and consumer topologies. In this embodiment the analysis of intermediate delays was performed after the threshold value was exceeded, but an analysis of intermediate delays can also be triggered when the overall call set-up delay falls below or is equal to a threshold value.

Also in the flowchart, call set-up delays, opposed to termination delays, were monitored to identify and isolate latent total, partial, or potential failures. Overall and/or intermediate call termination delays for an interne protocol connection can be monitored in place of the set-up delays or in combination with the set-up delays in a multiplicity of combinations.

Figure 3:
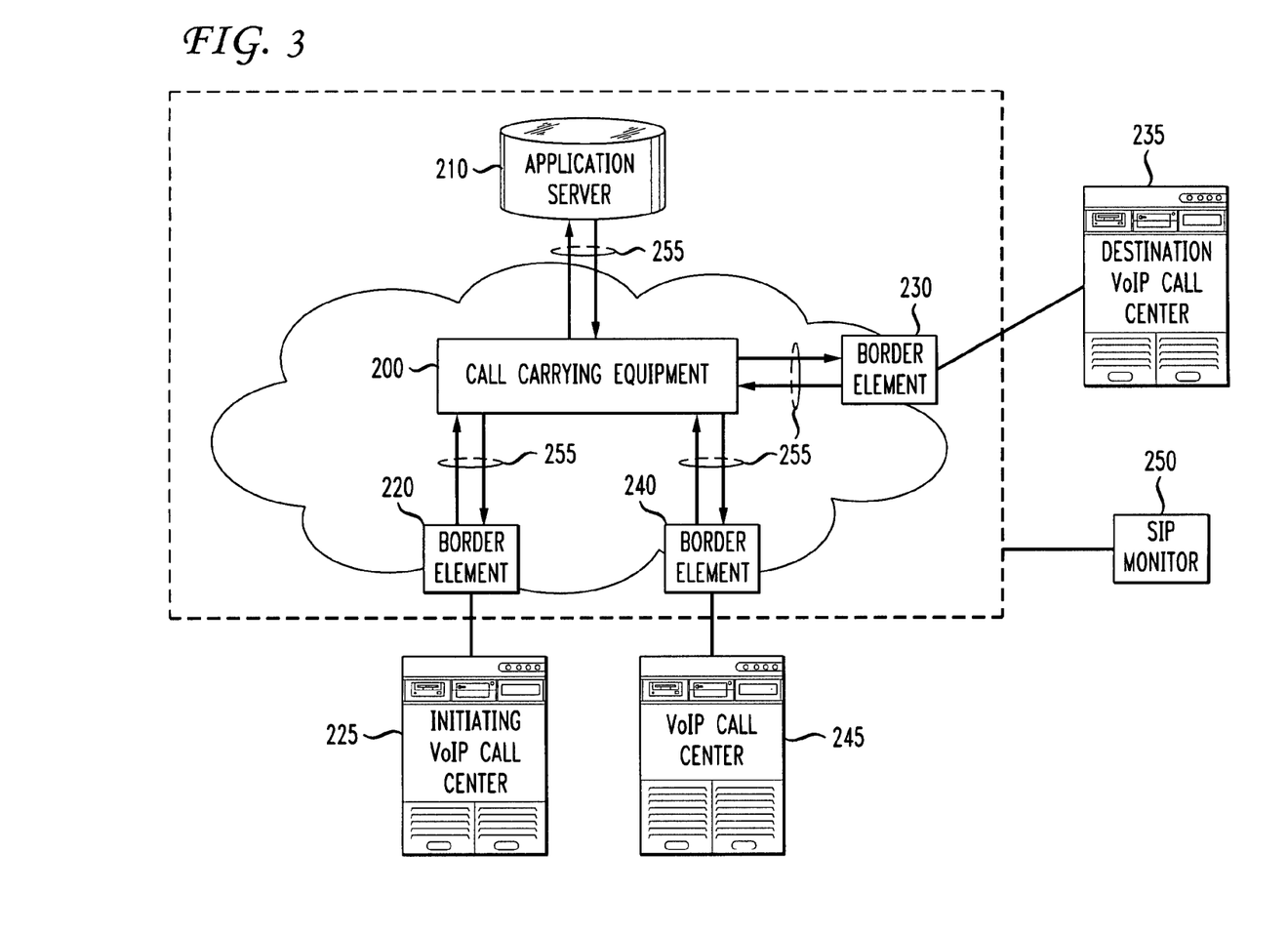
FIG. 3 is a diagram illustrating an embodiment of the invention.
Figure 4:
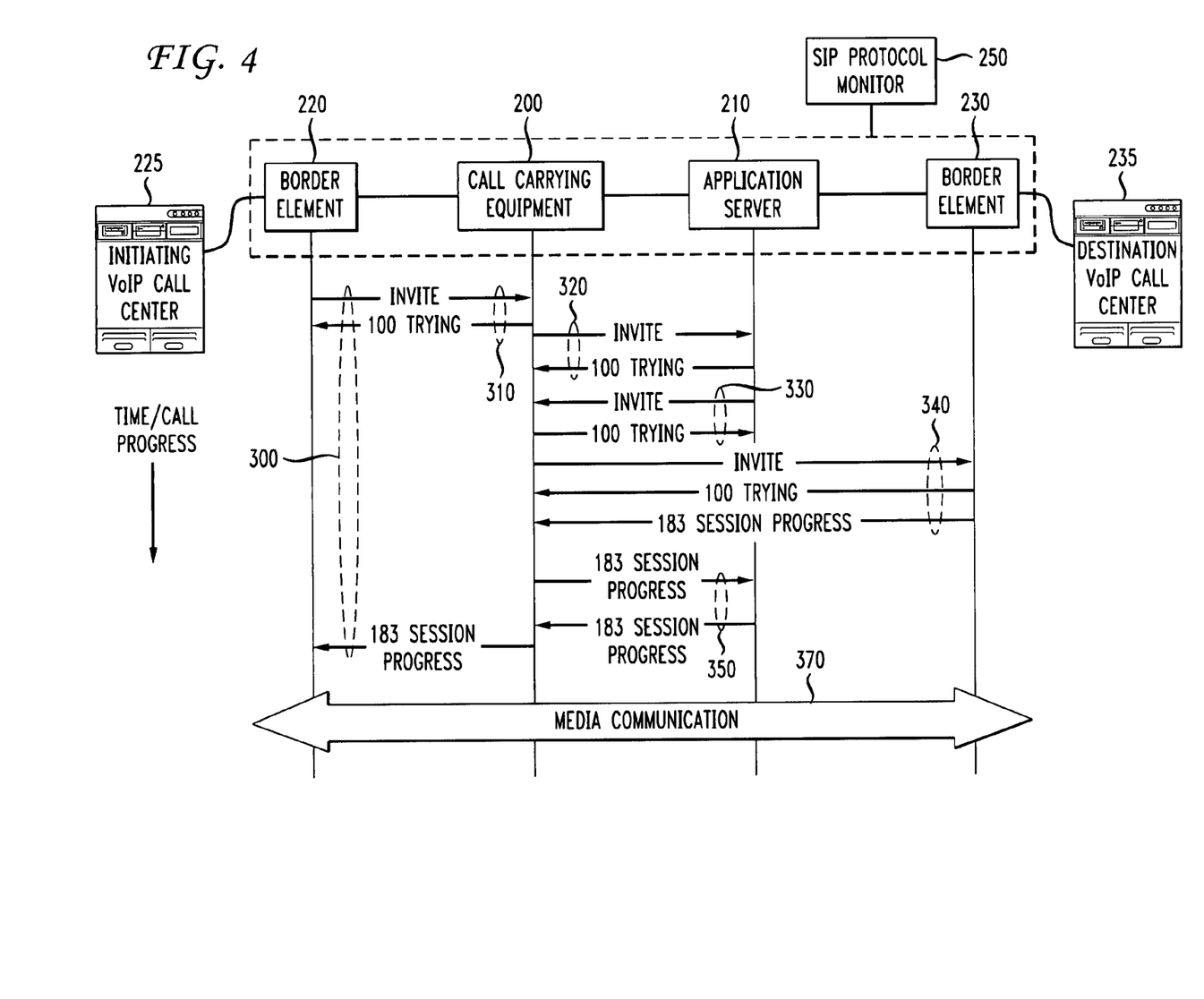
FIG. 4 illustrates a call set-up protocol message exchange for the embodiment in FIG. 3.
Figure 5:
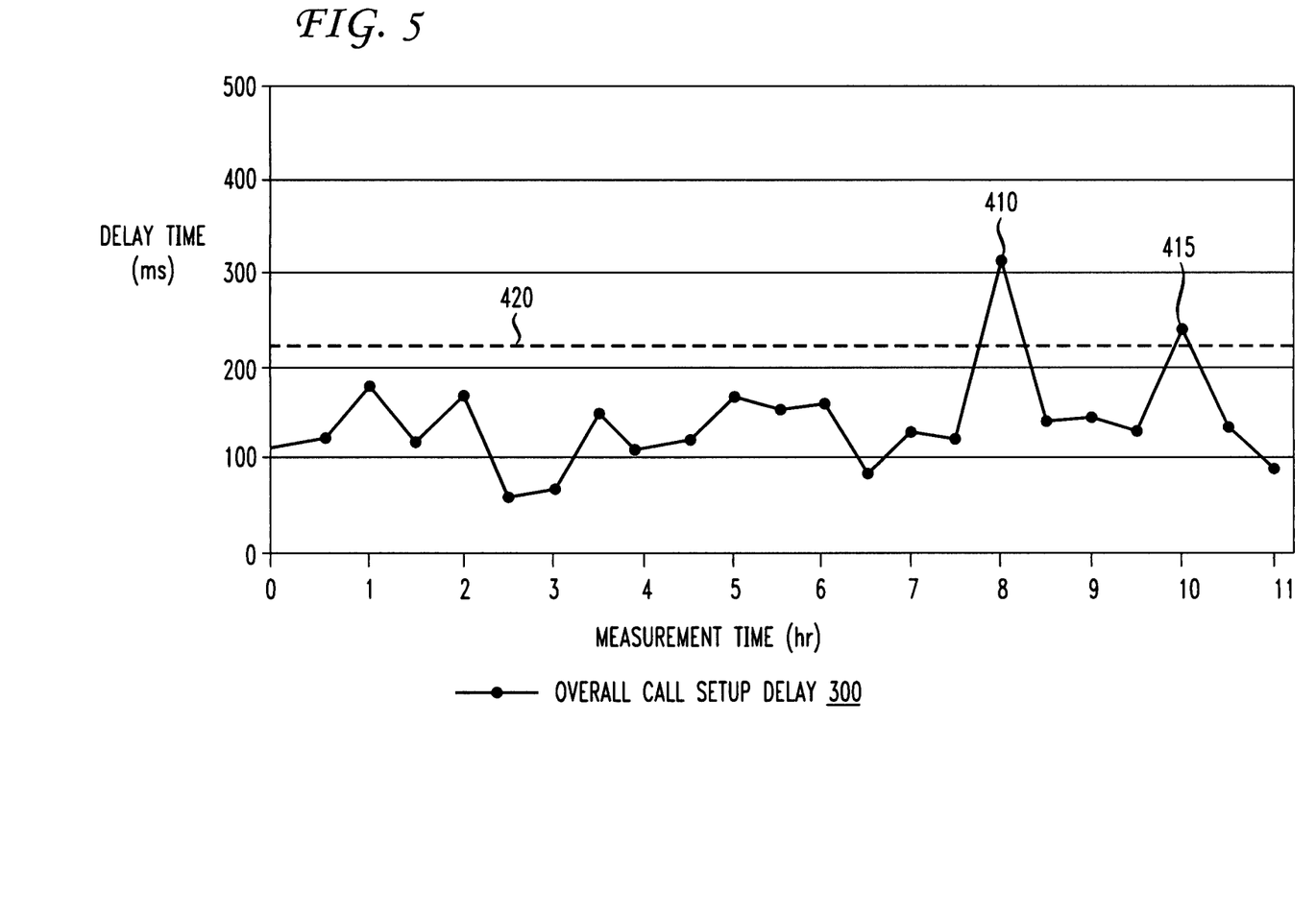
FIG. 5 is a graph of delay measurements from the embodiment in FIGS. 3-4.
Figure 6:
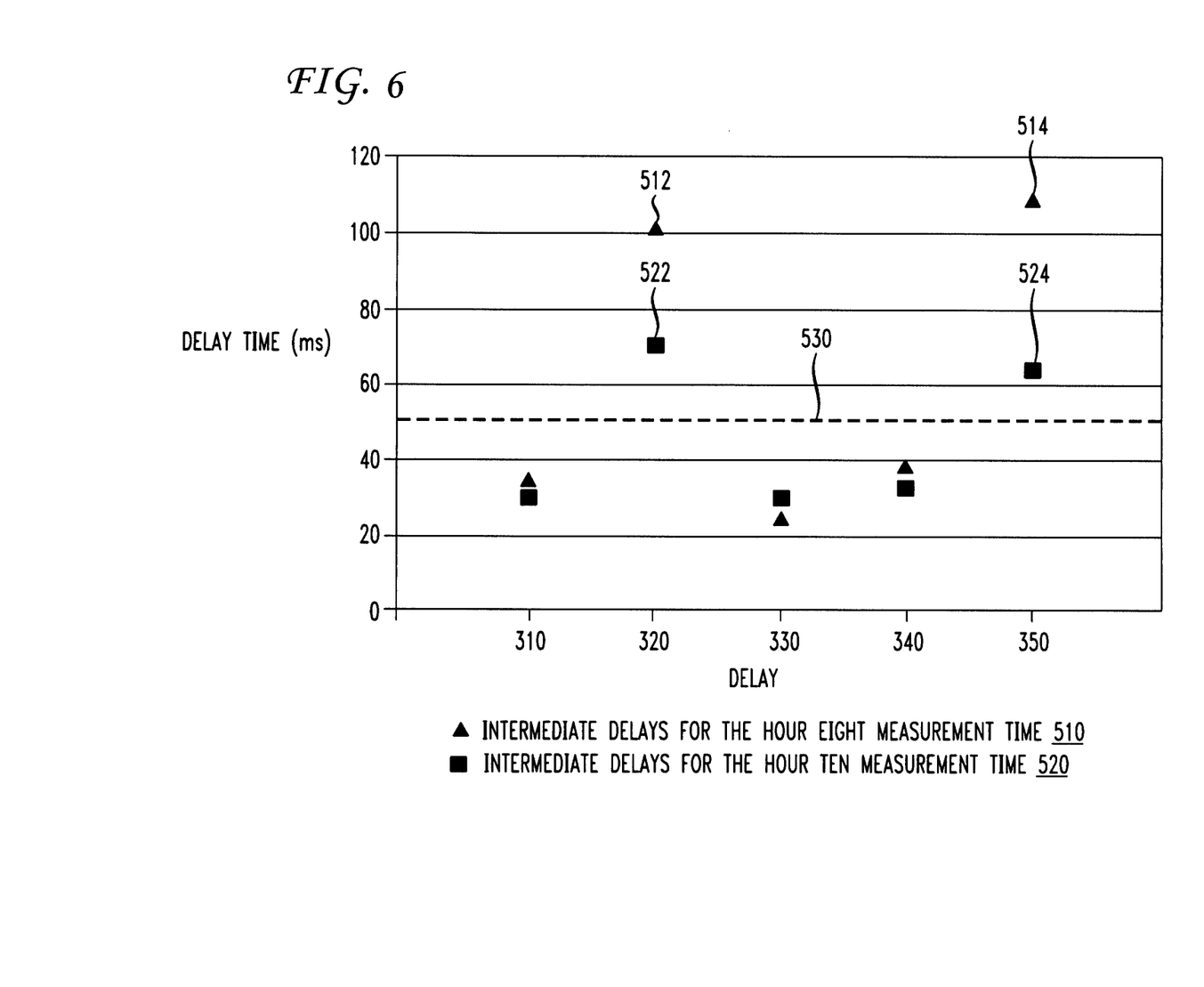
FIG. 6 is a graph of delay measurements from the embodiment in FIGS. 3-4.

FIGS. 3-6 illustrate an example of the monitoring and analysis of Standard Session Initiation Protocol (SIP) messages, a typical protocol for setting up voice over internet protocol (VoIP) phone calls, to isolate problems or potential problems in call set-up network equipment or segments of the call set-up network. This embodiment utilizes the method described in the flowchart illustrated in FIG. 1. FIG. 3 is a diagram that shows the topology of VoIP call set-up network equipment and FIG. 4 illustrates a SIP message exchange between network devices from FIG. 3 involved in setting up a connection for a VoIP call. FIGS. 5-6 are graphs that show the overall and intermediate delay values respectively for the devices in FIGS. 3-4.

FIG. 3 illustrates a SIP monitor 250 monitoring SIP messages exchanged between VoIP call set-up network components. In this embodiment, the call set-up network components are border elements 220, 230, and 240, an application server 210, and call carrying equipment 200. The SIP monitor 250 measures the intermediate delays 255 between the sending and the receiving of SIP messages by each of the network components during the set-up of VoIP connections. VoIP call centers 225, 235, and 245, are connected to border elements 220, 230, and 240, respectively, for purposes of describing the operation of an embodiment of the invention. VoIP call center 225 is a call center initiating a VoIP phone call connection and VoIP call center 235 is a destination call center receiving the VoIP phone call.

Although in this embodiment, the SIP monitor 250 is a single device, in alternative embodiments, multiple SIP monitors can be distributed throughout the network to monitor the network elements. Also, a variety of devices can be connected to the network through the border elements including any type of audio, video, or other multimedia communication device or terminal that is capable of engaging in an internet protocol connection.

FIG. 4 is an illustration of the exchange of SIP messages between network elements to establish the VoIP phone call connection between the VoIP call center 225 initiating the phone call and the VoIP call center 235 that is the intended destination of the call shown in FIG. 3. The vertical axis represents time or the progress of the call and the horizontal axis illustrates the network elements monitored for SIP message exchanges, the border elements 220 and 230, the call carrying equipment 200, and the application server 210. The arrows in the figure represent the exchange of the SIP messages and the direction that SIP messages are being passed between the components during the VoIP call connection set-up. The direction and order of the SIP messages can vary significantly from this example depending upon user inputs or on the types of connections being established. For example, if two nodes have difficulty communicating, multiple invite or 100 trying messages can be exchanged in addition to those shown.

The overall call set-up delay 300 is the difference in time between the sending of an invite SIP message from the border element 220 to the call carrying equipment 200 and the receipt of the 183 session progress SIP message from the call carrying equipment 200 at the border element 220. Delays 310-350 are intermediate call set-up delays between the network call set-up components. For example, intermediate delay 320 is the difference in time between the sending of an invite SIP message from the call carrying equipment 200 and the reply of a 100 trying SIP message from the application server 210.

Although in this embodiment the overall call set-up delay 300 is the time between the sending of the invite SIP message from the border element 220 and receipt of the 183 session progress SIP message at the border element 220, the overall call set-up delay 300 can be defined differently. For example, the overall call set-up delay can be defined as the difference in time between the sending of the invite SIP message from the border element 220 and receipt of the 183 session progress SIP message at the call carrying equipment 200 from the border element 230. In this case, the overall call set-up delay is the combination of the intermediate delays 310-340.

After the call set-up messages are exchanged and a VoIP connection is established, the VoIP call centers 225 and 235 can communicate 370 over the VoIP connection using a media protocol such as real-time transport protocol (RTP).

FIG. 5 is a graph of the overall call set-up delay 300 as measured by the SIP monitor 250 from FIG. 4. The vertical axis in this graph is time delay measured in milliseconds (ms) and the horizontal graph is measurement time in hours. Each data point in this graph is the average of the overall call set-up delay measurements for thirty minutes. The dashed line at 220 ms is the overall call set-up delay threshold 420. The threshold 420 as well as the sampling can be adjusted to accommodate the volume of data, the statistical limits imposed, or the sensitivity of the monitoring or call set-up equipment. For example, if early detection of a less conspicuous problem is desirable, the threshold limits can be tightened and the sampling rate increased to target that problem.

The graph shows that all of the measurements are below the overall call set-up delay threshold 420 except for overall call set-up delays 410 and 415 at measurement hours eight and ten, respectively. The overall call set-up delay 410 is 310 ms and the overall call set-up delay 415 is 225 ms. At the time of their detection, the excessive overall call set-up delays 410 and 415 trigger further analysis of the intermediate delays 310-350 of FIG. 3 to determine which network elements or connections caused the excessive delay.

FIG. 6 is a graph that shows the intermediate delay measurements for delays 310-350 at hours eight and ten, the times of excessive overall call set-up delays 410 and 415 from FIG. 4. The vertical axis in the graph is time delay measured in milliseconds (ms) and the horizontal axis in the graph shows the delays 310-350 of FIG. 3. The triangle data points are the intermediate delays for the hour eight measurement time 510 and the square data points are the intermediate delays for the hour ten measurement time 520. The graph also shows the threshold limit for each of the intermediate delays at fifty milliseconds 530. Although the threshold limit for each of these intermediate delay measurements in this embodiment are all the same, in alternative embodiments, the intermediate threshold delay can be different for each intermediate delay measurement.

The graph shows that at measurement hour eight the delay measurement 512 and at measurement hour ten the delay measurement 522 for delay 320 exceed the threshold limit 530 of fifty milliseconds. The graph also shows that at hours eight and ten the delay measurements 514 and 524, respectively, for delay 350 exceed the threshold limit 530 of fifty milliseconds. In this case, both of the delays 320 and 350 involve SIP message exchanges being sent from the call carrying equipment 200 and responses sent from the application server 210. The slow response from the application server 210 isolates the application server 210 or the connection between the call carrying equipment 200 and the application server 210 as the potential cause for the long overall call set-up delay measurements in FIG. 5.

This method detects and isolates total, partial, and latent total failures of one or more network elements or connections by analyzing delay data collected by an internet protocol monitor during the set-up or termination of an internet protocol connection. While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents. While the invention has been particularly shown and described with reference to specific embodiments thereof, it will be understood that various changes in form and details may be made.

What is claimed is:

1. A method, comprising:
receiving overall call protocol delay information related to call set-up session initiation protocol messages exchanged for a call set-up between a call initiating node, a call destination node and a plurality of network elements, the overall call protocol delay information including information about a plurality of intermediate delays related to connections between the plurality of network elements;
processing, during the call set-up, the overall call protocol delay information with reference to an overall time delay threshold;
triggering an intermediate delay analysis if the overall call protocol delay information exceeds the overall time delay threshold;
processing the plurality of intermediate delays with reference to a respective intermediate time delay threshold of a plurality of intermediate time delay thresholds, wherein at least two of the plurality of intermediate time delay thresholds are different; and
identifying a segment as being in a failure state in response to an associated one of the plurality of intermediate delays exceeding the respective intermediate time delay threshold, wherein an intermediate time delay of the plurality of intermediate time delays is a difference in time between receiving a send time indicator associated with an initial call set-up session initiation protocol message sent from the call initiating node in a network and receiving a receive time indicator associated with the call initiating node receiving a response call set-up session initiation protocol message sent from a responding node in a network in response to the initial call set-up session initiation protocol message, the initial call set-up session initiation protocol message sent by the call initiating node prompts a plurality of call set-up session initiation protocol messages propagated between the plurality of network nodes to trigger the response call set-up session initiation protocol message produced by the responding node and received by the call initiating node, the call initiating node and the responding node are any two nodes in the network.

2. The method of claim 1, wherein the network elements are involved in a call set-up process between the call initiating node and the call destination node.

3. The method of claim 1, wherein the segment is involved in a call set-up process between the call initiating node and the call destination node.

4. The method of claim 1, wherein the failure state includes a partial failure state.

5. The method of claim 1, wherein the connections between network elements includes a connection between adjacent network elements.

6. A method, comprising:
- receiving overall time delay information related to call set-up session initiation protocol messages exchanged for a call set-up between a call initiating node, a call destination node and a plurality of network nodes, the overall time delay information including information about a plurality of intermediate time delays;
- processing, during the call set-up, the overall time delay information with reference to an overall time delay threshold;
- triggering an intermediate delay analysis if the overall time delay information exceeds the overall time delay threshold;
- receiving from a network protocol monitor the plurality of intermediate time delays, wherein each one of the plurality of intermediate time delays is associated with a network node;
  - processing the plurality of intermediate delays with reference to a respective intermediate time delay threshold of a plurality of intermediate time delay thresholds, wherein at least two of the plurality of intermediate time delay thresholds are different; and
  - identifying a network segment as causing an overall time delay if an associated intermediate time delay exceeds the respective intermediate time delay threshold, wherein an intermediate time delay of the plurality of intermediate time delays is a difference in time between receiving a send time indicator associated with an initial call set-up session initiation protocol message sent from the call initiating node in a network and receiving a receive time indicator associated with the call initiating node receiving a response call set-up session initiation protocol message sent from a responding node in a network in response to the initial call set-up session initiation protocol message, the initial call set-up session initiation protocol message sent by the call initiating node prompts a plurality of call set-up session initiation protocol messages propagated between the plurality of network nodes to trigger the response call set-up session initiation protocol message produced by the responding node and received by the call initiating node, the call initiating node and the responding node are any two nodes in the network.

7. The method of claim 6, wherein identifying the network segment as causing the overall time delay includes:
- generating an alarm indicator when the overall time delay information exceeds the overall time delay threshold.

8. The method of claim 6, wherein the network segment includes a network connection.

9. The method of claim 6, wherein the network node is initiating an Internet protocol connection.

10. The method of claim 6, wherein the network node is terminating an internet protocol connection.

* * * * *